United States Patent
Bode

(10) Patent No.: US 7,523,651 B2
(45) Date of Patent: Apr. 28, 2009

(54) METHOD FOR MONITORING THE STATE OF TURBINES BASED ON THEIR COASTING TIME

(75) Inventor: Andreas Bode, Höchstadt / Aisch (DE)

(73) Assignee: Siemens Aktiengesellschaft, Munich (DE)

( * ) Notice: Subject to any disclaimer, the term of this patent is extended or adjusted under 35 U.S.C. 154(b) by 131 days.

(21) Appl. No.: 11/792,542

(22) PCT Filed: Dec. 1, 2005

(86) PCT No.: PCT/EP2005/056372

§ 371 (c)(1),
(2), (4) Date: Jun. 7, 2007

(87) PCT Pub. No.: WO2006/061348

PCT Pub. Date: Jun. 15, 2006

(65) Prior Publication Data

US 2008/0049887 A1    Feb. 28, 2008

(30) Foreign Application Priority Data

Dec. 8, 2004    (EP)    ................................. 04029099

(51) Int. Cl.
*G01M 15/14*    (2006.01)

(52) U.S. Cl. ................................................. 73/112.01
(58) Field of Classification Search .............. 73/112.01, 73/112.02, 112.03, 112.04, 112.05, 112.06
See application file for complete search history.

(56) References Cited

U.S. PATENT DOCUMENTS

| 3,769,790 | A | * | 11/1973 | Thebert | ...................... 60/39.08 |
| 3,795,131 | A | * | 3/1974 | Wade et al. | ................... 73/1.28 |
| 4,057,714 | A | | 11/1977 | Fork et al. | |
| 2007/0051111 | A1 | * | 3/2007 | Uluyol et al. | .................. 60/778 |

FOREIGN PATENT DOCUMENTS

EP    0 843 244 A1    5/1998

* cited by examiner

*Primary Examiner*—Eric S McCall

(57) ABSTRACT

The invention relates to a method for monitoring the condition of turbines using their coasting time. The aim of the invention is to ensure that the monitoring process is as sensitive as possible with low resource requirements. To achieve this, the measured coasting time ($t_{measured}$) is corrected by a correction member, in which the temperature of the medium ($T_{medium}$) in the turbine that has likewise been measured, is taken into consideration and compared with a reference value.

5 Claims, 1 Drawing Sheet

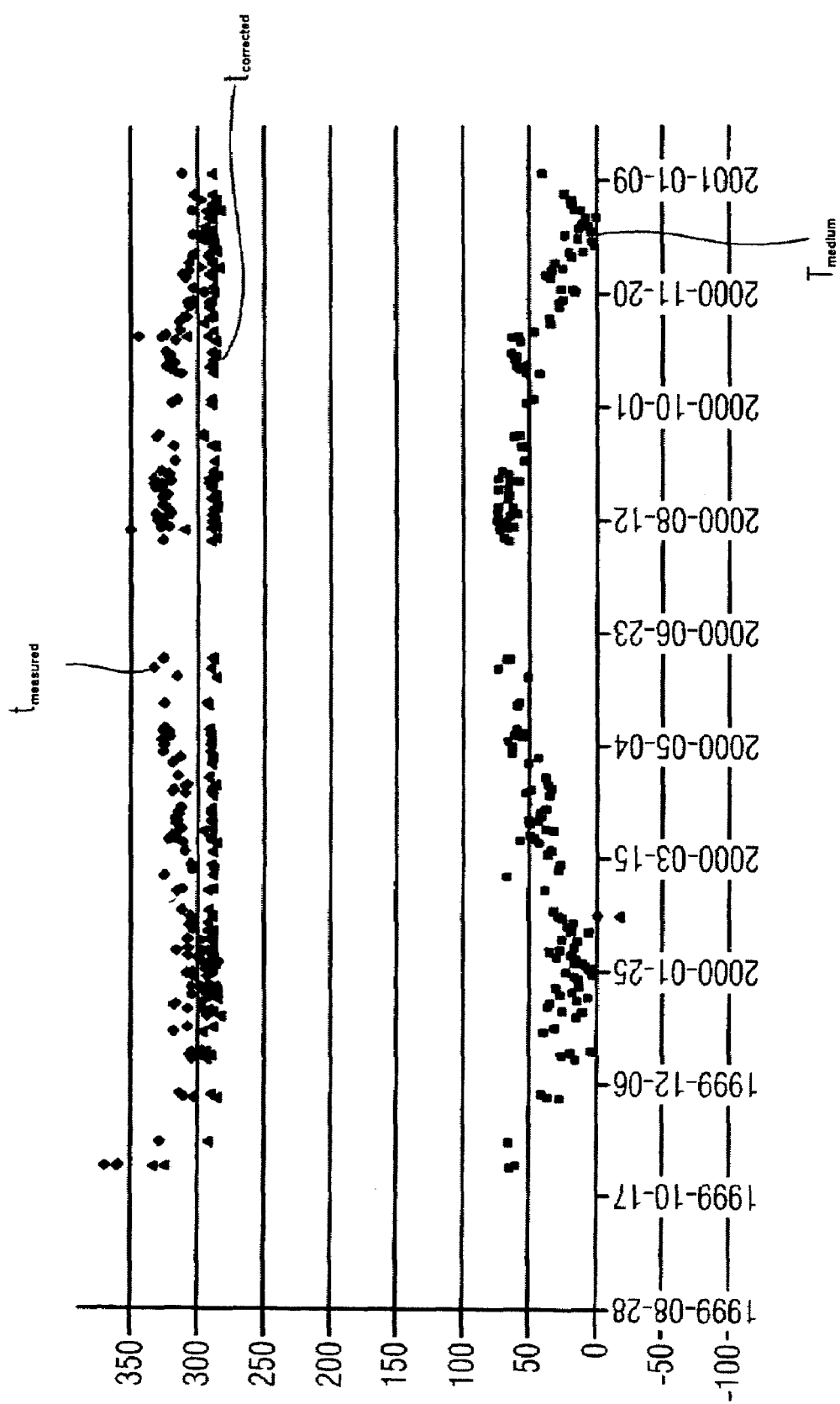

METHOD FOR MONITORING THE STATE OF TURBINES BASED ON THEIR COASTING TIME

CROSS REFERENCE TO RELATED APPLICATIONS

This application is the U.S. National Stage of International Application No. PCT/EP2005/056372, filed Dec. 1, 2005 and claims the benefit thereof. The International Application claims the benefits of European application No. 04029099.1 filed Dec. 8, 2004, both of the applications are incorporated by reference herein in their entirety,

FIELD OF INVENTION

The invention relates to a method for monitoring the state of turbines based on their coasting time.

BACKGROUND OF THE INVENTION

The coasting time of a turbine, for example a gas or steam turbine, is defined as the time between shutting off the turbine drive system and reaching a lower limit value of the turbine speed. It is a function of the mechanical state of the turbine and is influenced for example by the state of the bearings and their supply of oil or the ventilation or possible contact with the turbine blades.

The coasting time of a turbine can therefore be used to monitor the state of the turbine and thus as an indicator of machine problems. It is possible in this manner to identify and eliminate technical problems at an early stage, before permanent damage occurs.

The coasting time of turbines is therefore determined manually or automatically and compared with a reference value. Deviations between the measured coasting time and the reference value may indicate machine problems and must be investigated further. Of course the coasting time of a turbine is also influenced by the current temperature of the medium in the turbine (intake air in gas turbines and respectively water vapor in steam turbines). However this temperature is subject to natural or operation-induced fluctuations, which can result in fluctuations of around 5% to 10% in the measured coasting time. A fluctuation range of 5% to 10% is however too large to permit a meaningful comparison with the reference value and therefore sensitive monitoring of the coasting process.

SUMMARY OF INVENTION

The object of the invention is therefore to specify a method for monitoring the state of turbines based on their coasting time, which is particularly sensitive and can at the same time be implemented with the lowest possible outlay of technical resources.

According to the invention this object is achieved in that the measured coasting time is corrected using a correction element, in which the similarly measured temperature of the medium in the turbine is also taken into account, and compared with a reference value.

The invention is thereby based on the consideration that for the most sensitive monitoring possible of the coasting process, factors influencing the coasting time and having a natural fluctuation that cannot be ignored should be used to correct the measured coasting time. This allows their influence on the measured coasting time to be calculated, allowing a narrower fluctuation range to be achieved for the coasting time and therefore more sensitive monitoring. One particularly major factor influencing coasting time and having a particularly large fluctuation range is the temperature of the medium in the turbine. It should therefore be captured and used to correct the measured coasting time.

The advantages achieved with the invention consist in particular of the fact that a significant reduction can be achieved in the fluctuation range of the determined coasting time with very little resource outlay. The temperature of the medium in the turbine is either available in any case as an operational measurement or is relatively simple to measure.

By correcting the measured coasting time using the temperature of the medium, which represents a manner of normalizing the coasting time with temperature, it is possible to reduce the fluctuation range of the determined coasting time from around 5% to 10% to around 1% to 2%. This results in significantly more sensitive monitoring of the coasting process and therefore the mechanical state of the turbine. Machine problems, which may result in permanent and serious damage to the turbine, can thus be identified and eliminated at an even earlier stage.

The reference value for the coasting time is also advantageously corrected using the temperature of the intake air or the water vapor. In this instance the reference value also has a low level of error and is therefore more meaningful than without correction.

The measured coasting time is advantageously corrected in that the temperature of the medium in the turbine is multiplied by a correction factor a and added to the measured coasting time.

The correction factor a describes the influence of the temperature of the medium in the turbine on the coasting time of the turbine and it can have a positive or negative value. It is a function of the respective turbine and must first be determined. To this end for example both the coasting times and the temperatures of the medium in the turbine can be captured in a test run of the turbine. The correction factor a is then determined, which best calculates the temperature profile out of the coasting times for all the coasting times considered. The value for a thus found can then be used routinely. It must be determined once again, if reconstruction work is carried out on the turbine or other events occur, which may change the influence of the temperature of the medium in the turbine on the coasting time.

The correction factor a is advantageously determined automatically. The reference value for the coasting time is also advantageously determined automatically. This ensures routine and reliable monitoring of the coasting process of the turbine.

BRIEF DESCRIPTION OF THE DRAWINGS

An exemplary embodiment of the invention is described in more detail below with reference to the drawing;

FIG. 1 shows a diagram to illustrate the correction of the temperature effect on the coasting time of a turbine.

DETAILED DESCRIPTION OF INVENTION

The coasting time of a turbine, in other words the time the turbine takes, after the turbine drive system has been shut off, to reach a speed, which corresponds to a fixed lower limit value, is a function of different factors, which define the mechanical state of the turbine. Therefore monitoring the coasting time is a suitable means for monitoring the mechanical state of a turbine and for identifying damage at an early stage. Of course the temperature of the medium in the turbine, in other words air or water vapor, also influences the coasting time. This temperature effect must be corrected out of the measured coasting time, to ensure particularly sensitive monitoring. The figure shows the correction of measured coasting times for the temperature effect. According to the formula $$t_{corrected} = t_{measured} + a * T_{medium},$$

the temperature of the medium in the turbine $T_{medium}$ multiplied by the correction factor a is added to the measured coasting time $t_{corrected}$. FIG. 1 shows that this correction does in fact allow the temperature profile to be calculated out of the measured coasting times. This means that the coasting times are normalized in respect of the temperature of the medium in the turbine.

Eliminating the temperature effect from the coasting times results in greatly improved comparability of the corrected coasting times $t_{corrected}$, such that the corrected coasting times $t_{corrected}$ can be compared directly with a reference value. The corrected coasting times $t_{corrected}$ are therefore particularly suitable for routine monitoring of the mechanical state of a turbine.

The invention claimed is:

1. A method for monitoring a state of a turbine, comprising:
   measuring a coasting time of the turbine;
   measuring a temperature of a medium in the turbine;
   comparing the medium temperature with a reference value; and
   correcting the measured coasting time using a correction element, where the correction element takes into account the comparison of the medium temperature with a reference value.

2. The method as claimed in claim 1, wherein the reference value for the coasting time is corrected using the temperature of the medium in the turbine.

3. The method as claimed in claim 2, wherein the correction is effected in that the temperature of the medium in the turbine is multiplied by a correction factor and added to the measured coasting time.

4. The method as claimed in claim 3, wherein the correction factor is determined automatically.

5. The method as claimed in claim 4, wherein the reference value for the coasting time is determined automatically.

* * * * *